United States Patent Office 3,681,133
Patented Aug. 1, 1972

3,681,133
PHOTOCONDUCTIVE TITANIUM DIOXIDE
COMPOSITION
Horace F. Dantro, Toms River, N.J., assignor to
N L Industries, Inc.
No Drawing. Filed Dec. 7, 1970, Ser. No. 95,891
Int. Cl. H01c 7/08; H01b 1/08
U.S. Cl. 117—201                                    2 Claims

ABSTRACT OF THE DISCLOSURE

A new type of photoconductive anatase titanium dioxide composition has been produced which comprises euhedral shaped titanium dioxide particles having an average individual crystal size from 0.2 to 5.0 microns, the surface of said crystals containing a dense coating of lead oxide in amount from 0.2% to 4%, the percentages calculated as PbO and based on the weight of the titanium dioxide.

BACKGROUND OF THE INVENTION

Many types of photoconductive pigments have been produced by the prior art. The instant invention is concerned with the preparation of photoconductive titanium dioxide pigments. In application Ser. No. 1529, filed Jan. 8, 1970, now U.S. Pat. No. 3,632,572, issued Jan. 4, 1972, a process is described for producing a new type of photoconductive $TiO_2$ material which may or may not contain loosely adhering coatings of $Al_2O_3$, $SiO_2$, ZnO, PbO and $TiO_2$.

The $TiO_2$ material itself is described in application Ser. No. 1529 and consists of euhedral shaped crystals having an average crystal size of 0.2 to 5.0 microns. Although this material possesses a high degree of photoconductivity when incorporated in a paper system, whether the $TiO_2$ particles are coated or not, the photoconductivity is particularly enhanced if the particular type of dense, firmly adherent lead oxide coating of the instant invention is formed on the surface of the euhedral $TiO_2$ particles.

SUMMARY OF THE INVENTION

The photoconductive product of the instant invention consists of euhedral shaped crystals of anatase titanium dioxide having an average particle size of 0.2 to 5.0 microns, the surface of said particles having a firmly adherent, dense coating of lead oxide in amount from 0.2% to 4%, calculated as PbO, the percentages based on the weight of the titanium dioxide.

Basically the euhedral shaped crystals of $TiO_2$ are prepared using the process described in application Ser. No. 1529 and the crystals are coated in the following manner.

The $TiO_2$ particles after ball-milling are slurried in water and the slurry is heated to 60° C. To the heated slurry is added an alkali metal hydroxide until the pH is raised to 10–11. A solution of a lead salt, such as e.g. lead acetate, is then added over a period of 15–45 minutes and the pH is held above 10.

After holding the mixture for at least 30 minutes at a pH of at least 10, the pH is lowered slowly to pH of 7.5 in an orderly fashion over a period of one hour. The product is then filtered and washed well with water. After drying at 110–120° C., the product is then milled.

DESCRIPTION OF THE PREFERRED EMBODIMENT

The $TiO_2$ base composition used in the instant invention is prepared by the process described in U.S. Pat. No. 3,632,527 which comprises hydrolyzing a titanium sulfate-iron sulfate solution to form a titania hydrate, filtering, bleaching and washing said hydrate to remove the soluble iron salts therefrom. The bleached hydrate is substantially iron-free but contains from 5% to 15% $H_2SO_4$ associated with said hydrate. The hydrate is slurried and treated with a sufficient amount of an ammoniacal agent selected from the group consisting of ammonia, ammonium hydroxide and ammonium carbonate to neutralize the titania hydrate slurry to a pH of 5.0 to 11.0. The neutralized titania hydrate contains an amount of sulfate no greater than 2% $SO_3$ in said hydrate, calculated on a $TiO_2$ basis. The washed titania hydrate is treated with an alkali metal salt selected from the group consisting of sodium chloride, sodium sulfate, sodium pyrosulfate, sodium hydroxide, sodium carbonate, potassium chloride, potassium sulfate, potassium pyrosulfate, potassium hydroxide and potassium carbonate. The amount of sodium compound added, calculated as $Na_2O$, is from 0.4% to 2.0%, while the amount of potassium compound added, calculated as $K_2O$, is from 0.4% to 3.0%. The phosphorous content in the hydrate should not exceed 0.1% $P_2O_5$ on a $TiO_2$ basis. The treated hydrate is then calcined at a temperature from 900° C. to 1025° C. for hydrates containing $K_2O$ and 875° C. to 925° C. for hydrates containing $Na_2O$ to develop the highly crystalline anatase titanium dioxide euhedral material. The calcined material is then ground and the ground material has an average individual crystal size of from 0.2 to 5.0 microns. The size of the individual crystals are about 0.2 micron when the $K_2O$ treated hydrate is calcined at 900° C. This size increases however to about 0.7 micron when the calcination temperature is raised to 1000° C.

Using $Na_2O$ as the treating agent, the titanium dioxide crystals have the anatase structure when calcined at about 875–925° C. with the crystal size of about 0.25–5.0 micron.

The use of potassium salts is preferred over sodium salts since it is easier to maintain the crystal structure of anatase using potassium salts. Potassium sulfate is particularly desirable to employ since its use reduces the amount of potassium titanate formed. It is desirable to maintain the amount of potassium titanate formation to less than 2%. The rutile content preferably should also be held below 10%.

In the previously described U.S. Pat. No. 3,632,527 the euhedral $TiO_2$ particles may or may not be coated with a metal oxide coating of $Al_2O_3$, $SiO_2$, ZnO, PbO or $TiO_2$. This coating is formed on the suface of the $TiO_2$ particles as a loosely adhering coating. It is formed by adding an aqueous solution of an acid salt of the metal compound to a slurry of the $TiO_2$ and the metal oxide is formed by reacting the acid salt of the metal compound with an alkali (e.g. NaOH) which precipitates the metal oxide compound onto the surface of the $TiO_2$ particles. The pH of the final slurry is about 7.0.

In contrast to the previously described process in U.S. Pat. No. 3,632,527, the euhedral $TiO_2$ particles in the instant invention are coated in a different manner with PbO and therefore a firmly adherent and dense coating of PbO is formed on the surface of the $TiO_2$ particles. The instant coating process may be described as follows:

(1) A ball-milled slurry of euhedral $TiO_2$ particles is heated to 60 to 90° C. and the pH is adjusted to at least 10 to 11 by adding an alkali metal compound, e.g. NaOH;

(2) A lead salt, e.g. lead acetate, is then added as an aqueous solution to the $TiO_2$ slurry over a period of from 15–45 minutes while the pH is held above 10.0;

(3) The mixture is then held for at least 30 minutes at a pH of at least 10;

(4) After all of the metal salts has been added, the pH is lowered at the rate of 0.5 pH units per 10 minute intervals to pH of 7.5 by adding dilute $H_2SO_4$ to the mixture.

After coating, the product is filtered, washed, dried and ground.

The final products are tested for photoconductivity as follows:

TESTS FOR PHOTOCONDUCTIVITY

The titanium dioxide material is dispersed in a solution of methyl methacrylate copolymer made by E. I. Du Pont Company and sold under the name of Elvacite 6014. To the mixture is added 0.02% fluoroescein from a methanol solution.

25.0 grams of the titanium dioxide material are dispersed in 62.5 mls. of a solution of the copolymer (100 grams copolymer solution diluted to 1000 ml. with toluene) by mixing in a high speed blender for 5 minutes. The mixture is then applied to an aluminum sheet 0.0015 inch thick with a Bird film applicator (gap width 0.003 inch, wet film thickness of about 0.0015 inch) to give a coating weight of about 13 pounds per 3000 sq. ft. per ream. The film is then oven-dried at 50° C. for one minute.

A small piece of the coated foil is then dark-adapted over-night and tested in the dynamic-capacitor electrometer where the electro-photographic properties are measured as follows:

1—Charge acceptance
2—Dark decay
3—Light decay

The dynamic-capacitor electrometer used is similar to the apparatus described in R.C.A. Review, 22, 780–90 (1961), except that the one square inch samples are mounted on the rim of the nine inch diameter wheel (30 in. circumference) so that the true charging time and light exposure times are each $\frac{1}{30}$ the nominal time in the cycle. The negative corona is operated at —7000 volts. The probe voltages are followed with a strip chart recorder. The light source is a 500 watt-tungsten-iodine filament lamp mounted 8 inches from the edge of the rim with a 10% neutral density filter to reduce the light intensity to about 25 foot-candles at the specimen. The cycle arbitrarily selected from the test involves 10.0 seconds (nominal) of charging, 5.0 seconds of dark decay and the light exposure is continued to allow the surface voltage to decay below 40 volts.

The product produced is then further tested for useful photoconductivity by actually preparing a print on a test film in a commercial copier. For this test, the pigmented copolymer film prepared as described above and coated either on a 3 mil. aluminum foil or a commercially available conductive paper, is dark-adapted overnight and used to make a single page copy on a commercially available copier. For this purpose a Model 33 Electrostatic Copier manufactureded by the SCM Corporation is used. A useful photoconductive film will yield a high contrast, clear and sharp copy with a light background and little or no streaking, stemming from inhomogeneous corona charging of the test film, in the direction of motion of the film through the machine.

The following examples are presented in order to describe the instant invention in more detail:

EXAMPLE 1

Euhedral $TiO_2$ particles were prepared as follows:

3600 mls. of titanium sulfate-iron sulfate solution containing 250 g.p.l. $TiO_2$, 169 g.p.l. $FeSO_4$ and 500 g.p.l. $H_2SO_4$ were heated to 96° C. and were added within a period of 16 minutes to 900 mls. water heated to 96° C. The entire mixture was heated to boiling and boiled for 3 hours to complete the hydrolysis. 950 mls. of hot water were added to the mixture to cut the concentration to 165 g.p.l. $TiO_2$.

The hydrate was filtered, washed free from soluble iron salts, bleached with 10% $H_2SO_4$ and 0.1% aluminum metal for 1 hour at 80° C. at 20% solids, then filtered and washed with water until iron free. The washed filter cake contained 10% $H_2SO_4$ on a $TiO_2$ basis. 2570 grams of the filter cake containing 35% solids were admixed with 1500 mls. water to form a slurry containing 22% solids. With agitation, 31.5 grams of ammonia, added as a solution in water, were added to the hydrate slurry to neutralize substantially all of the sulfuric acid present in the hydrate. The pH of the neutralized hydrate was 6.8. The neutralized hydrate was then agitated for 1 hour and the pH readjusted with ammonia to a pH of 6.8.

The neutralized solids were then filtered and washed with water. The washed titania hydrate contained 0.18% sulfate calculated as $SO_3$ and 0.07% $P_2O_5$ on a $TiO_2$ basis.

The washed titania hydrate was then treated with $K_2SO_4$, calculated as 2.0% $K_2O$ on a $TiO_2$ basis, and the treated hydrate was then rotary calcined at 970° C. for 3 hours to produce a highly crystalline anatase titanium dioxide material. The calcined material contained 2.0% $K_2O$, 0.07% $P_2O_5$ and the individual crystals of the $TiO_2$ were euhedral in shape with a major portion of the crystal edges being straight-sided. The average individual crystal size was 0.7 micron.

These euhedral $TiO_2$ particles were then coated as follows:

(1) 250 grams of the euhedral $TiO_2$ crystals described above were admixed with water to form a slurry containing 33% solids; 0.3% of a dispersing agent, such as monoisopropanolamine, were added to the slurry and the slurry was ground in a ball-mill for 3 hours and the ball-mill discharge was heated to 60° C.;

(2) To the heated slurry was added a 50% solution of sodium hydroxide to raise the pH to 11.0 after which an additional 17 ml. of the 50% NaOH were added;

(3) After holding for 5 minutes, 100 ml. of an aqueous solution of lead acetate containing 50 g.p.l. PbO were added over a period of 30 minutes. This amount of lead acetate is equal to 2% PbO on a $TiO_2$ weight basis. The pH of the solution was maintained at pH of 11.0 during the addition period;

(4) After all of the lead acetate had been added the slurry was adjusted with $H_2SO_4$ to pH of 10.5 and held for 30 minutes;

(5) The pH of the slurry was then lowered 0.5 pH at 10 minute intervals by adding $H_2SO_4$ until the pH of the slurry reached 7.5;

(6) The slurry was filtered and the cake washed with $H_2O$ until the wash water was sulfate free;

(7) The washed filter cake was then dried and mikropulverized.

The ground product has the following photoconductive properties:

Charge acceptance—400 volts
Dark decay—29 volts per second
Light decay—180 volts per second

EXAMPLES 2–5

In these runs the procedure of Example 1 was repeated except that the amounts of lead oxide coating has varied from 0.5% to 4.0%. The photoconductivity results are recorded in the able along with those of Example 1.

TABLE

| | Examples | | | | |
|---|---|---|---|---|---|
| | 1 | 2 | 3 | 4 | 5 |
| Percent PbO | 2.0 | 0.5 | 1.0 | 3.0 | 4.0 |
| Photoconductivity: | | | | | |
| Charge acceptance | 400 | 420 | 416 | 356 | 356 |
| Dark decay | 29 | 43 | 34 | 17 | 19 |
| Light decay | 180 | 164 | 173 | 155 | 183 |
| Type of coating | (1) | (1) | (1) | (1) | (1) |

1 Dense firmly adherent.

It has clearly been shown by the table that the dense adherent coating of PbO formed by the process of the instant invention onto the surface of the euhedral $TiO_2$ particles produces excellent photoconductivity.

While this invention has been described and illustrated by the examples shown, it is not intended to be strictly limited thereto, and other variations and modifications may be employed within the scope of the following claims.

I claim:

1. Composition of matter consisting essentially of euhedral titanium dioxide crystals, a majority of the edges of said crystals being straight-sided, said crystals having an average individual crystal size of from 0.2 to 5.0 microns, said crystals having the crystal structure of anatase, said crystals being coated with a dense adherent coating of lead oxide, the amount of lead oxide coating being from 0.2% to 4.0%, the percentages based on the weight of said titanium dioxide.

2. Method for producing a new composition of matter consisting essentially of euhedral titanium dioxide anatase crystals, said crystals containing an adherent dense coating of lead oxide, said process which comprises forming an aqueous slurry of euhedral $TiO_2$ particles, heating the slurry from 60° C. to 90° C., adjusting the pH of the slurry to at least 10 by adding an alkali metal compound, adding a soluble lead salt to said aqueous slurry over a period of at least 15 minutes while maintaining the pH to at least 10, the amount of said lead salt being from 0.2% to 4.0% calculated as lead oxide and based on the weight of said titanium dioxide, holding the mixture for at least 30 minutes at a pH of at least 10, then lowering the pH at a rate of no more than 0.5 pH units per 10 minute intervals by adding an acid until the pH is lowered to at least 7.5, then filtering, washing, drying and milling said coated product.

References Cited

UNITED STATES PATENTS

| | | | |
|---|---|---|---|
| 3,522,078 | 7/1970 | May et al. | 117—100 B |
| 3,552,995 | 1/1971 | Powell | 117—100 B X |
| 2,331,444 | 10/1943 | Wanier | 252—501 |
| 2,516,548 | 7/1950 | Canuenberg et al. | 23—202 |
| 2,671,031 | 3/1954 | Whately | 117—100 B |

RALPH S. KENDALL, Primary Examiner

U.S. Cl. X.R.

117—221, 100 B; 252—501